United States Patent [19]

Kuma et al.

[11] Patent Number: 5,580,370

[45] Date of Patent: Dec. 3, 1996

[54] TOTAL HEAT ENERGY EXCHANGER ELEMENT PREVENTING A TRANSFER OF ODORS AND METHOD OF MANUFACTURING SAME

[75] Inventors: Toshimi Kuma, Fukuoka; Noriaki Shirahama, Ohnojo, both of Japan

[73] Assignee: Kabushiki Kaisha Seibu Giken, Fukuoka-ken, Japan

[21] Appl. No.: 51,706

[22] Filed: Apr. 26, 1993

[30] Foreign Application Priority Data

May 3, 1992 [JP] Japan .................................. 4-157222

[51] Int. Cl.$^6$ ...................................................... B01D 53/02
[52] U.S. Cl. ................................ 96/154; 96/125; 428/116; 428/482; 428/186; 428/283; 428/331; 428/402
[58] Field of Search ...................................... 428/116, 117, 428/182, 186, 283, 344, 402, 407, 457, 905; 96/125, 154

[56] References Cited

U.S. PATENT DOCUMENTS

| | | |
|---|---|---|
| 4,769,053 | 9/1988 | Fischer . |
| 5,161,686 | 11/1992 | Weber et al. ............................ 428/283 |
| 5,308,703 | 5/1994 | Tsujimoto et al. ...................... 428/283 |

OTHER PUBLICATIONS

Adsorption Surface and Porosity, S. J. Gregg and K. Su Sing, Academic Press, London, 1967, p. 160.
Hand Both of Chemistry Edited By The Chemical Society of Japan, Applied Chemistry Parts, Part I, Maruzen pp. 256–257, Oct. 1986.
The Chemistry of Silica, pp. 488–492 (1979) Ralph H. Iler.
Principles of Adsorption and Adsorption Processes Douglas M. Ruthven, pp. 48 & 49 (1984).

Primary Examiner—James J. Bell
Attorney, Agent, or Firm—Staas & Halsey

[57] ABSTRACT

Adsorbents are used whose equilibrium isotherms for adsorption show no rapid rise in relative humidity more than 40% and whose equilibrium isotherms for adsorption and desorption show no hysteresis phenomenon and in which adsorbed humidity does not cause capillary condensation, for example, A-type or RD-type silica gel or hydrophilic zeolite. Adhesive or binder is applied on the surface of a metallic sheet, a plastic sheet or a ceramic fiber paper, and particulates of the above-mentioned adsorbents are fixed on or in it to get a total heat energy exchanger material. The total heat energy exchanger material is corrugated and laminated to obtain a total heat energy exchanger element. When outer air or return air contains various odorous gases, these odorous gases can be mostly prevented from transferring into supply air through the total heat energy exchanger. When particulates of the above-mentioned adsorbents and chemical blowing agents are mixed in adhesive and said chemical blowing agents are made to blow by heating, the part of adsorbent particulates buried in the adhesive layer can also function as adsorbent through communicating pores and thus total heat energy exchange efficiency can be increased.

22 Claims, 9 Drawing Sheets

TOTAL HEAT ENERGY EXCHANGER ELEMENT PREVENTING A TRANSFER OF ODORS AND METHOD OF MANUFACTURING SAME

BACKGROUND OF THE INVENTION a. Field of the Invention

The present invention relates to a total heat energy exchanger element which prevents odor transfer and the method of manufacturing same, wherein adsorbent particles are rigidly fixed to a sheet, such as metal, plastics, ceramic fiber paper and the like, and the sheet is laminated and formed into a honeycomb structure.

b. Description of the Prior Art

In U.S. Pat. No. 4,769,053, there is disclosed a method of producing a total heat energy exchanger material by attaching a composition comprising a molecular sieve to the surface of a sheet, the molecular sieve having a plurality of pores of a diameter of about 3 Å.

Examples of adsorbents used in the above-mentioned patent are zeolite and synthesized zeolite. Among moisture adsorbents, silica gel provides for high efficiency of total heat energy exchange and can be obtained easily. Silica gels used as adsorbents include A-type, B-type, RD-type, ID-type -and the like. A-type gel and RD-type gel, with large surface areas and small capacities of minute pores, have high efficiency of moisture adsorption in low humidity, but they have low efficiency of moisture adsorption in highly humid atmosphere. On the other hand, B-type and ID-type gels, with small surface areas and large capacities of minute pores, have high efficiency of moisture adsorption in highly humid atmosphere, but have low efficiency of moisture adsorption in conditions of low humidity (see the *Handbook of Chemistry* edited by The Chemical Society of Japan, Applied Chemistry Parts, Part 1, Process Section, Maruzen, pp. 256–257, Oct. 15, 1986), incorporated herein by specific reference. FIG. 1 illustrates equilibrium isotherms for water vapor adsorption of A-type, RD-type and B-type silica gels manufactured by Fuji Davison Chemistry Co., Ltd., zeolite and an active alumina at 25° C. (see Technical Data 90072084 of this company, incorporated herein by specific reference). In this literature and others the type of silica gel as a moisture adsorbent is not specified. But in order to cope with hot and humid outer air during summer in Japan, B-type silica gel with high desiccative capacity in high humidity is generally used for multi-cylinder type dehumidifiers and for pressure swing adsorption type dehumidifiers.

But the silica gels mentioned above adsorb not only humidity but also various odors (gases). For example, in the summertime, hot and humid outer air is passed through a supply air zone of a rotating total heat energy exchanger element while return air from the room controlled at proper temperature and humidity is passed through a return air zone of the total heat energy exchanger element. Thus, by the rotating total heat energy exchanger element the temperature and the humidity of the outer air are lowered, and the resulting air is supplied in the room. In such an operation in the low humidity atmosphere, various odorous materials mixed in room air or outer air are adsorbed and accumulated on part of the silica gel particles in the total heat energy exchanger element.

In general, silica gel of any one of A-type, RD-type, ID-type and B-type has the characteristic of adsorbing humidity in preference to odorous materials. In the case of B-type silica gel, especially when highly humid outer air passes through an operating total heat energy exchanger element, such as in a rainy season or during a shower when the relative humidity of the air suddenly increases, the above-mentioned odorous materials adsorbed to and accumulated on the rotating element are suddenly purged by the adsorption of humidity contained in the outer air and these purged odorous materials are mixed into the supply air and distributed in the building causing the generation of odors in the rooms thereof, which odors are sensed by the occupants.

SUMMARY OF THE INVENTION

The present invention was derived by confirming that there is no generation of odor even if outer air of high relative humidity is suddenly received by an operating total heat energy exchanger element in which A-type or RD-type silica gel adsorbent or hydrophilic zeolite or any other similar adsorbent is used. The equilibrium isotherm for adsorption of water on the A-type or RD-type silica gel adsorbent or hydrophilic zeolite or other similar adsorbents does not rise suddenly and the equilibrium isotherms for adsorption and desorption do not show hysteresis so that equilibrium isotherms observed in adsorption and desorption experiments are not different, i.e., moisture adsorbed on the adsorbents does not cause "capillary condensation" in relative humidity conditions of more than about 40%.

Minute pores of A-type silica gel and B-type silica gel will now be compared. In B-type silica gel, as shown by the curve of B-type in FIG. 1, adsorption capacity in high humidity atmosphere is remarkably high and rapidly increases at around 50% relative humidity when the relative humidity of the atmosphere is gradually increased. The average diameter of the minute-pores of B-type silica gel is around 70 Å which is in the range of mesopores (diameter of pore: approximately 20–500 Å) and capillary condensation easily occurs in pores in this range. This is considered to be the result of the decrease of saturated vapor pressure in minute pores of such a diameter (see S. J. Gregg and K. S. W. Sing, *Adsorption Surface and Porosity*, Academic Press, London, 1967, p. 160). In B-type silica gel, the curve showing the equilibrium adsorption quantity in the case of gradually increasing humidity from low level as shown in the drawing (adsorption curve shown as "adsorption" in the drawing) and the curve showing equilibrium adsorption quantity in the case of gradually decreasing humidity from high level (desorption curve shown as "desorption" in the drawing) do not correspond, and the so-called hysteresis phenomenon is observed. This means that capillary condensation occurs in this region. Among the five classifications of adsorption isotherm types proposed by S. Brunauer et al. in J. Am. Chem. Soc., 62, 1723 (1940), Type I contains A-type and RD-type silica gels, alumina gel and hydrophilic zeolite with micropores of 4–6 Å diameter of FIG. 1. These adsorbents are of the type with minute pore diameters not far larger than adsorbate molecular diameter. Type II, under which the B-type silica gel of FIG. 1 falls, is the type with minute pore diameters of wide range, and multi-molecular laminar adsorption and capillary condensation phenomena occur.

Silica gel is porous material of various types with ultra-micropores, micropores, mesopores and/or macropores depending on its manufacturing method. Average minute pore diameters of A-type silica gel and B-type silica gel are about 22 Å and about 70 Å, respectively. But these gels also contain micropores of diameters from 1–2 to 4–5 times as large as the diameters of adsorbed molecules to a certain extent. In such small micropores, strong dispersion forces act besides the adsorbing forces by polarity between adsorbed molecules and micropores, and the molecules to be adsorbed are strongly adsorbed to pores. Therefore odorous materials and water molecules are partly accumulated in such minute micropores. In the total heat energy exchanger mentioned above, these odor and water molecules are accumulated in the minute pores and adsorption and desorption are repeated in a state of equilibrium inclined to the adsorption side. If outer air humidity suddenly increases here, in the case of B-type silica gel, its mesopores adsorb water vapor and are filled with liquid water. That is to say, capillary condensation occurs (cf., FIG. 2). In such conditions, there exist three phases, i.e., adsorption phase, solution phase and gas phase. Adsorbed materials (odorous materials) are distributed among these three phases and a binary equilibrium relationship exists, i.e., equilibrium between the adsorption phase and the solution phase and that between the solution phase and the gas phase. FIG. 2 shows a model of this relationship. In the drawing ⓐ depicts the gas phase, ⓑ depicts the solution phase (aqueous solution phase) and ⓒ depicts the adsorption phase. The arrows designated by [A] and [B] show the equilibrium relationship between ⓐ phase and ⓑ phase and that between ⓑ phase and ⓒ phase, respectively. In FIG. 2, the adsorbed molecules are limited to odor molecules and the water molecule adsorption is omitted. Adsorbed odor molecules easily dissolve in the solution phase and the odor materials in this aqueous solution are further dispersed into the gas phase. Thus, binary equilibriums of [A] and [B] are formed. Because gas phase ⓐ is a mobile gas phase, concentration of the odor molecules in ⓐ decreases immediately. Therefore, in order to keep the equilibrium odor molecules in ⓒ transfer to ⓑ and then to ⓐ. In brief, odor molecules are in an easily removable condition. Odor molecules are removed with water molecules. That is to say, when capillary condensation occurs due to the high humidity of the outer air, accumulated odor molecules are mixed with supply air SA and exhausted into a room immediately and the concentration reaches the level the human sense of smell can detect some.

In the case of A-type silica gel and RD-type silica gel, the average diameter of minute pores is around 22 Å, which is in the range of micropores (diameter less than about 25 Å). Pores in this range have a strong adsorbing force and at the same time mainly perform monolayer adsorption. There are only two phases, namely, adsorption phase and gas phase throughout all the range of relative humidity and equilibrium relationship between these two phases. Therefore, as shown by the curves of A-type silica gel and RD-type silica gel in FIG. 1, the quantity of water vapor adsorption does not suddenly increase even if the relative humidity increases and the hysteresis phenomenon is not observed and so capillary condensation scarcely occurs. That is to say, as there is no liquid water phase which dissolves adsorbed odor molecules easily, unlike B-type silica gel mentioned above, odorous materials are never suddenly purged by adsorption of outer air humidity, and this means that the odor generation is too small to be perceived by the human sense of smell.

From the foregoing, it will be apparent that the present invention relates to a method of manufacturing a total heat energy exchanger element preventing odor transfer and the total heat energy exchanger element obtained by this method. The characteristic of the present invention is to use adsorbents whose equilibrium isotherms do not rise rapidly from low humidity to high humidity, and whose equilibrium isotherms for adsorption and desorption do not show hysteresis so that equilibrium isotherms observed in adsorption and desorption experiments are not different, and in which the humidity does not cause "capillary condensation" in cases of relative humidity more than about 40%. For example, the adsorbents such as the above-mentioned A-type silica gel or RD-type silica gel, or hydrophilic zeolite having no mesopore capable of showing capillary condensation or the like can be used. Particulates of these adsorbents are fixed rigidly to the sheet surface of a metallic sheet or plastic sheet or ceramic fiber paper, etc. in the ratio of 30 g/m² at the greatest, and the sheet is laminated and formed into a honeycomb structure.

DETAILED DESCRIPTION OF THE PREFERRED EMBODIMENT

Example No. 1

Figure 3:
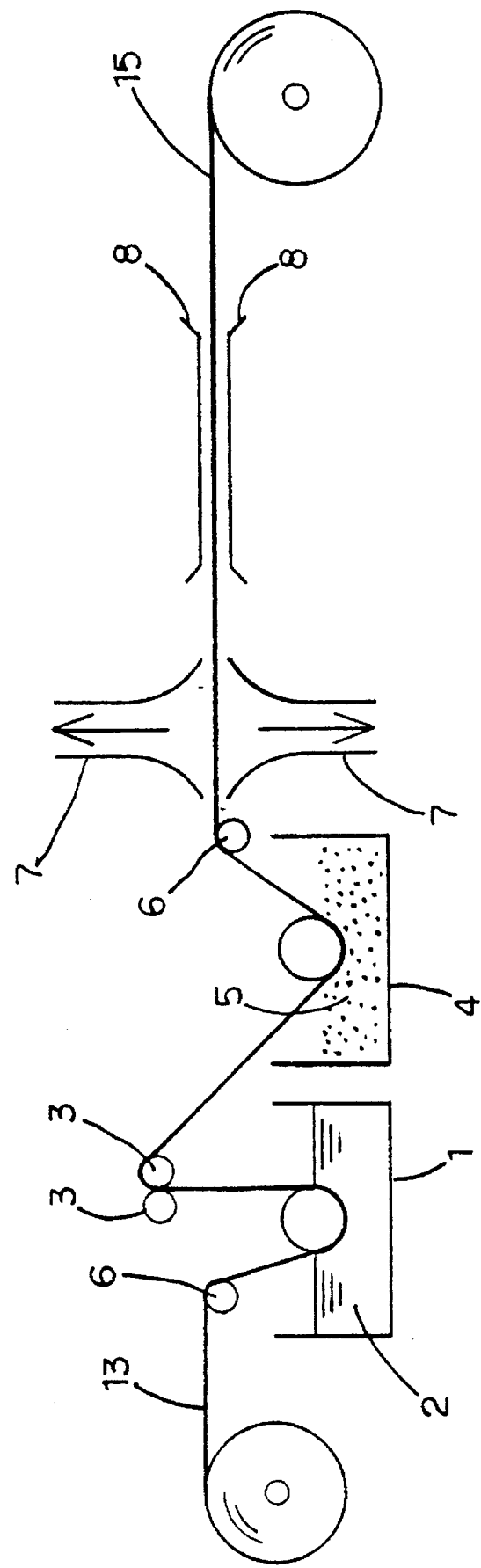
FIG. 3 is a schematic diagram illustrating a method of manufacturing the total heat energy exchanger material.

FIG. 3 schematically illustrates a device used to manufacture the total heat energy exchanger element of the present invention. In the drawing, reference numeral 1 designates a vessel of adhesive 2. The reference numeral 3 designates squeezing rollers, while the reference numeral 4 designates a vessel containing particulates 5 of A-type and/or RD-type silica gels. Guide rollers are shown as designated by reference numeral 6, suction ducts are designated by reference numeral 7 and the reference numeral 8 designates a heater.

To both surfaces of a 30μ thick aluminum sheet 13, a suitable amount of adhesive 2, consisting of polyvinyl acetate, is applied by adjusting the gap between squeezing rollers 3. The sheet 13 is fed into the vessel 4 containing the adsorbent particulates 5, and A-type and/or RD-type silica gel powder 5 of particle size below 0.2 mm adheres to both sides of the sheet 13 to temporarily fix the A-type and/or RD-type silica gel powder of around 20 g in total of both sides per 1 m² of the sheet surface area. Particulates of silica gel which do not adhere to the sheet 13 are removed by exhausting air through its ducts 7, 7.

The sheet 13 is then heated at a high temperature of 100°–250° C. by the heater 8 for a short time to completely dry and harden the adhesive and at the same time to form many communicating pores from the sheet surface to the adhesive layer surface by emitting gas and other impurities adsorbed in the A-type or RD-type silica gel minute pores and volatile ingredients in the adhesive so that adsorption capacity of the A-type or the RD-type silica gel is not impeded. In this manner the aluminum sheet 15 of a total heat energy exchanger element is produced.

Figure 4:
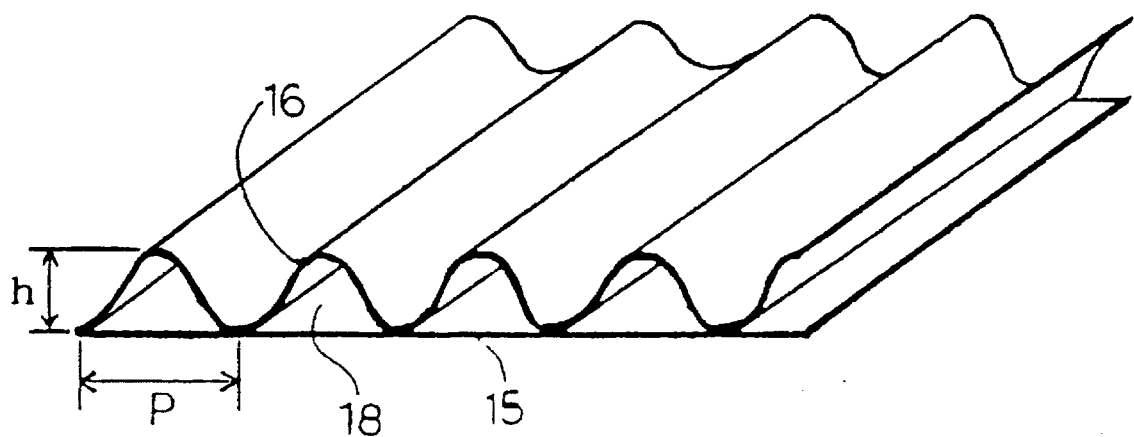
FIG. 4 is a perspective view of a single-faced corrugated sheet.
Figure 5:
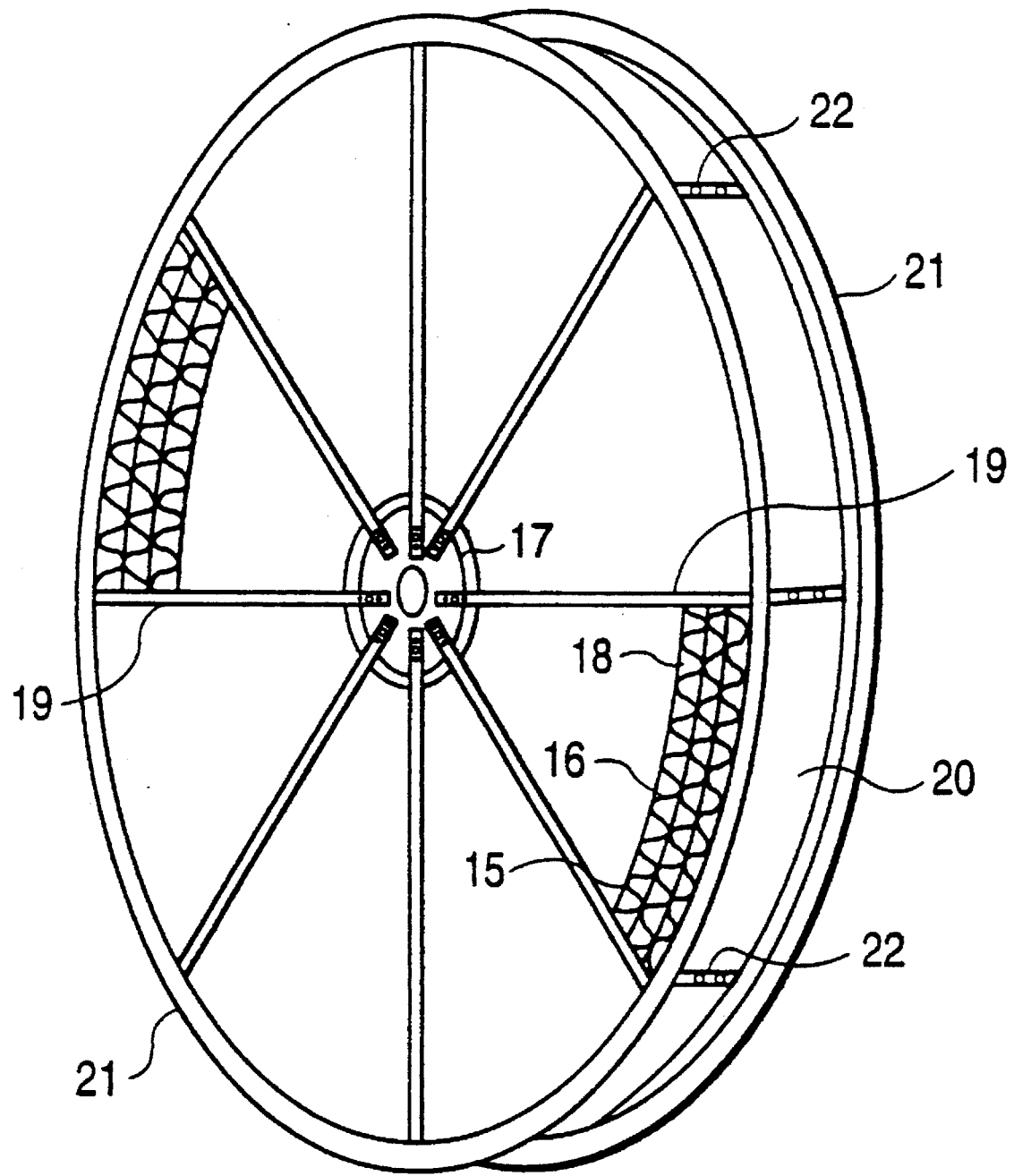
FIG. 5 is a perspective view of a rotary-type total heat energy exchanger element.

The total heat energy exchanger material thus obtained is corrugated, as shown in FIG. 4, and the flat sheet 15 and the corrugated sheet 16 are alternately adhered and laminated, and wound around a boss 17, as shown in FIG. 5, to a desired size to form a cylindrical structure with many small channels 18 between both end surfaces. Several grooves are cut in a radial direction on both end surfaces of the cylinder, and reinforcing spokes 19 are fitted in place and rigidly adhered. Outer circumferential steel plate 20 is wound around the circumferential surface. One end of each of the spokes 19 is rigidly secured to both end surfaces of the boss 17 and the other end thereof is secured to the outer circumferential steel plate 20 by an appropriate means such as bolting. Belt plates 21 are wound around both end edges of the outer circumferential steel plate 20 and rigidly fixed The connecting belt plates 22 are thereafter installed between the belt plates 21.

Example No. 2

An adhesive 2 consisting of polyvinyl acetate is mixed with about 20–40% of A-type and/or RD-type silica gel particulates and the adhesive is applied on both surfaces of the sheet 13. By rapidly heating this sheet to high temperature with heater 8, gas and other impurities adsorbed to silica gel are desorbed and the adhesive hardens. At the same time many minute communicating pores are formed in the adhesive layer. That is to say, silica gel particulates mixed in the adhesive layer adsorb and desorb humidity in the outer air through the above-mentioned communicating pores. The total heat energy exchanger material thus obtained is corrugated and laminated as in Example 1 to obtain a total heat energy exchanger element. A chemical blowing agent may be mixed in the adhesive.

Example No. 3

Into adhesive 2, consisting of polyvinyl acetate, about 20–40 weight % of A-type and/or RD-type silica gel or active alumina particulates and about 5 weight % of fine powder of sodium hydrogen carbonate or ammonium carbonate as chemical blowing agent are mixed. The adhesive is applied on both surfaces of the sheet 13. By rapidly heating the sheet to high temperature with the heater 8, chemical blowing agent in the adhesive decomposes and generates bubbles while the gas adsorbed to silica gel is desorbed and the adhesive hardens. At the same time many minute communicating pores are formed in the adhesive layer. That is to say, the buried silica gel particulates are able to adsorb humidity in outer air. The total heat energy exchanger material thus obtained is corrugated and laminated as in Example 1 to obtain a total heat energy exchanger element.

Example No. 4

Adhesive 2 consisting of acrylic resin is applied on both surfaces of the sheet 13. A mixture of A-type or RD-type silica gel particulates and hydrophilic zeolite particulates having little mesopores and hardly causing capillary condensation in a proper ratio is temporarily fixed on both surfaces of sheet 13 as in Example 1 and heated to high temperature with heater 8 to harden the adhesive.

In the above examples, the sheet material may be properly chosen from metals such as aluminum alloy, stainless steel, copper, brass, aluminum, plastics such as polyvinyl chloride, polypropylene and polyester, ceramic fiber paper and nonflammable paper, etc. which can be corrugated. A humidity adsorbent which does not promote odor transfer, i.e., hardly causes capillary condensation because of little mesopores such as the above-mentioned active alumina and hydrophilic zeolite is used with A-type and/or RD-type silica gel.

Sheet 13 consists of paper consisting mainly of inorganic fiber incapable of being ignited by hot air, for example, 0.1–0.3 mm thick paper mainly consisting of ceramic fiber, which contains 50–70% of ceramic fiber, 5–10% of glass fiber both with about 5μ diameter and 1–5 mm length, 30–5% of pulp and 10–20% of binder and paper strength reinforcing agent, or paper mainly consisting of pulp made nonflammable and reinforced by aluminum hydroxide.

The adhesive 2 used is polyvinyl acetate, epoxy resin, silicone resin and acrylic resin, etc. The inorganic binder (reinforcing agent for paper) is silica sol, alumina sol and the like.

Figure 6:
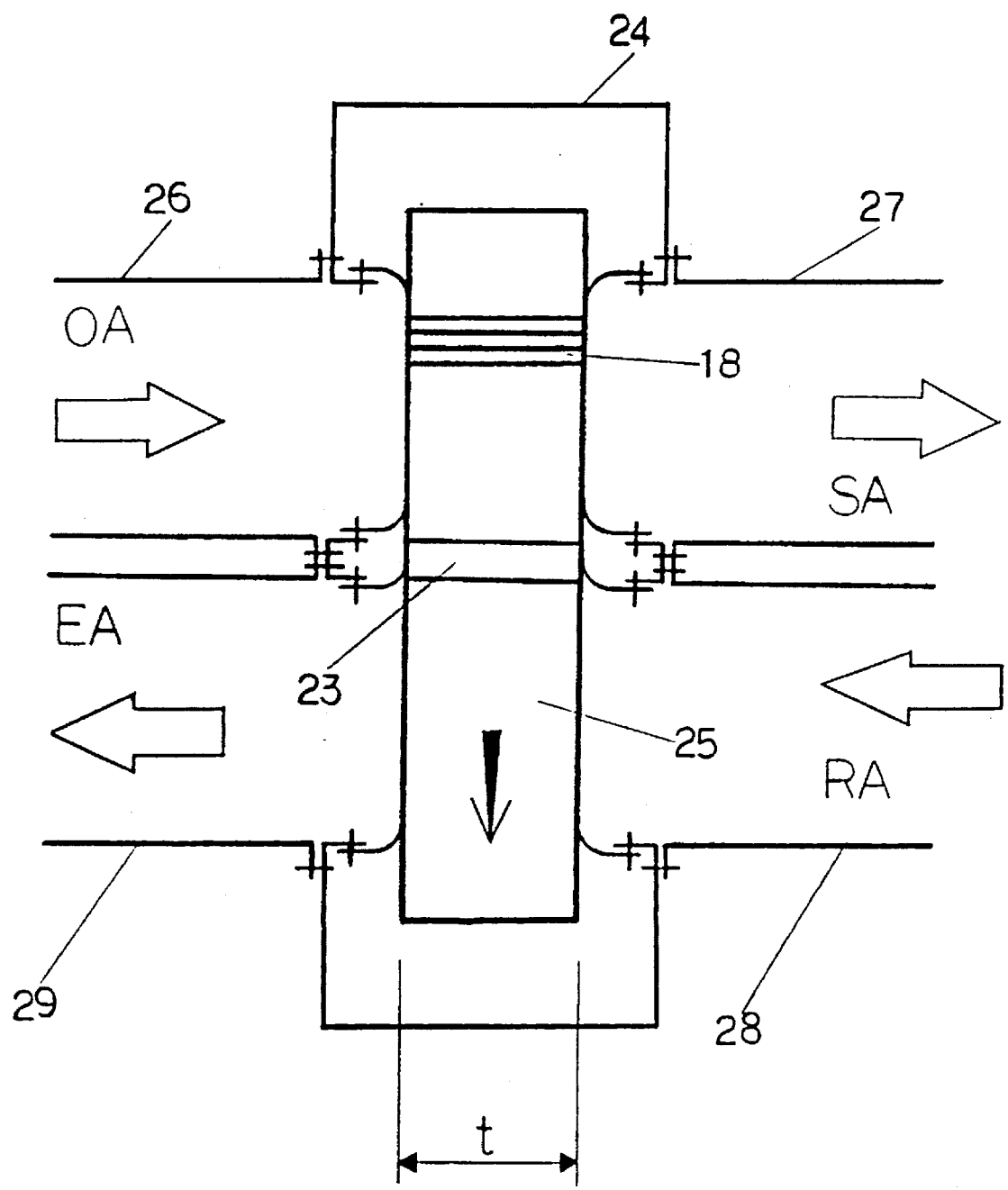
FIG. 6 is a vertical section view of a rotary-type total heat energy exchanger.

As shown in FIG. 6 the cylindrical total heat energy exchanger element obtained in the above examples is held rotatably and operably mounted by a shaft 23 and supported within the casing 24. Ducts 26, 27 and 28, 29 are provided so that both end surfaces of the element 25 are divided into the inlet air zone, the supply air zone, the return air zone and the exhaust air zone. The element 25 is rotated at the rate of about 16 r.p.m. Inlet air (OA) and return air (RA) define the juncture of total heat energy exchange between both airs through the total wall surface of small channels 18 of the element 25 to supply supply air (SA) and to exhaust exhaust air (EA)

Figure 8:
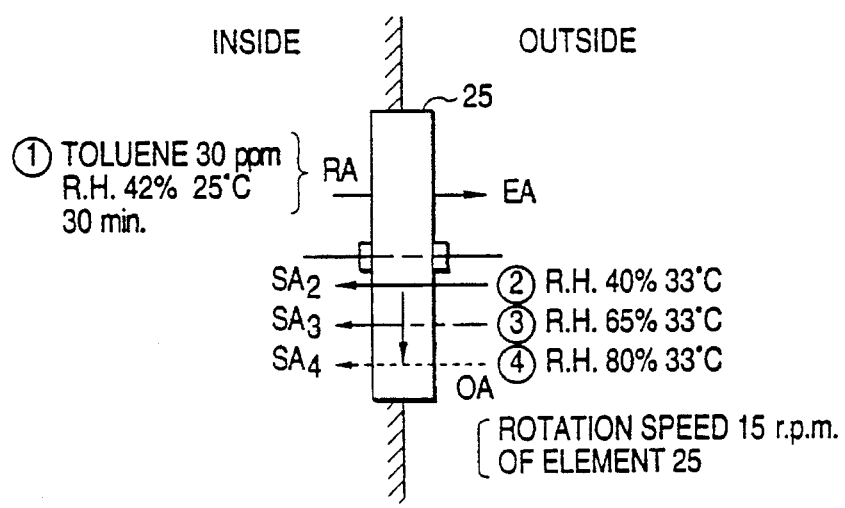
FIG. 8 is a graph illustrating the testing conditions of total heat energy exchanger elements.

Silica Gel PA-9035A of Fuji Davison Chemicals Co., Ltd. was used as the A-type silica gel and also the RD-type silica gel was used. Zeolum A-4 of Tosoh Co., Ltd. was used as the hydrophilic zeolite, and Silica Gel PA-9035B of Fuji Davison Chemicals Co., Ltd. was used as the B-type silica gel in a contrasting example. Their particle sizes were all around 200 mesh. According to Example 1, the above four kinds of adsorbents were rigidly adhered to both sides of 30μ thick four aluminum sheets in the ratio of 16 g in total of both sides per 1 $m^2$ of sheet surface area, respectively. These sheets were corrugated so that the wave length P is 4.2 mm and the wave height is 2.2 mm, respectively (cf. FIG. 4), and four kinds of total heat energy exchanger elements of 200 mm element width t (cf. FIG. 6) were manufactured. Under the condition described below an odor transfer test in each element was performed. As shown in FIG. 8, the total heat energy exchanger with each element was operated at a speed of revolution of 15 r.p.m.

① Air of 25° C. temperature and of 42% relative humidity containing 30 ppm of toluene as the odor substance was sent in as return air RA for 30 minutes, so that the moisture and toluene were adsorbed in the element, and then under the same conditions air containing no toluene was sent in continuously.

② On the other hand outer air of 33° C. temperature and of 40% relative humidity was sent in for 30 minutes, and thereafter, the transfer rate (%) and the transfer amount (ppm) of toluene into supply air $SA_2$ brought through the element were measured. The result is shown in points on the line of relative humidity of 40% in FIG. 7.

③ While outer air of 33° C. temperature and of 65% relative humidity was sent in, the transfer amount (ppm) and transfer rate (%) of toluene into the supply air $SA_3$ were measured. The result is shown in points on the line of relative humidity of 65% in FIG. 7.

④ While outdoor air of 33° C. temperature and 80% relative humidity was sent in continuously, the transfer amount (ppm) and transfer rate (%) of toluene into supply air $SA_4$ were measured. The result is shown in points on the line of relative humidity of 80% in FIG. 7.

The transfer ratio (%) of the drawings is calculated from toluene concentration (ppm) in supply air divided by toluene concentration (ppm) in return air. As seen from the drawings, when outer air of 33° C. and 80% relative humidity was treated, in the case of B-type silica gel, odor was perceived at transfer amount of about 5.5 ppm, and on the other hand in the case of A-type and RD-type silica gels and hydrophilic zeolite, transfer amounts were less than 0.4 ppm and odor was scarcely perceived. These toluene concentrations were measured by Gas Chromatograph GC-14A supplied by Shimadzu Corporation.

When methyl mercaptan and trimethylamine were tested as other odor materials, the odors could not be perceived by the human sense of smell. This test was performed by several people.

Figure 1:
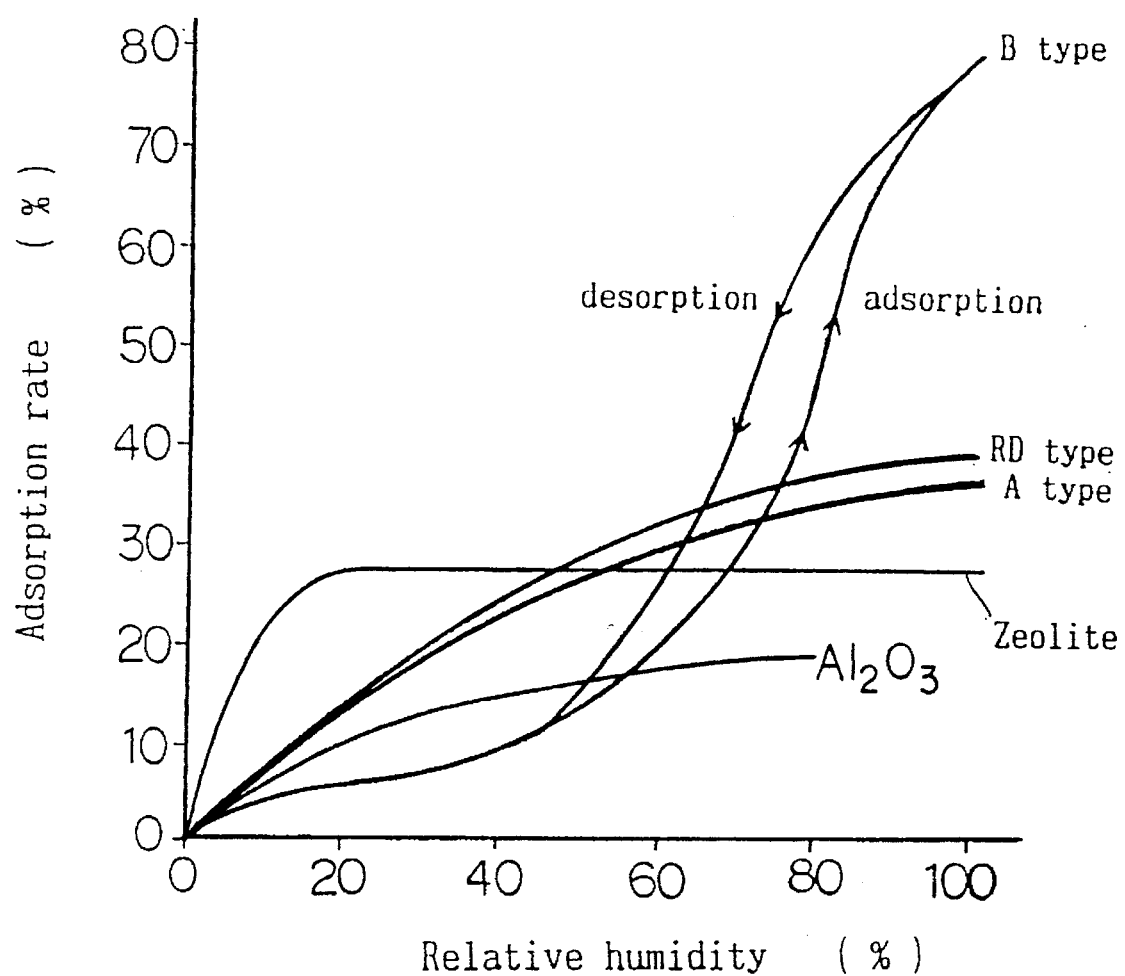
FIG. 1 is a graph showing equilibrium isotherms for adsorption of A-type, RD-type and B-type silica gels, alumina gels and zeolite.
Figure 2:
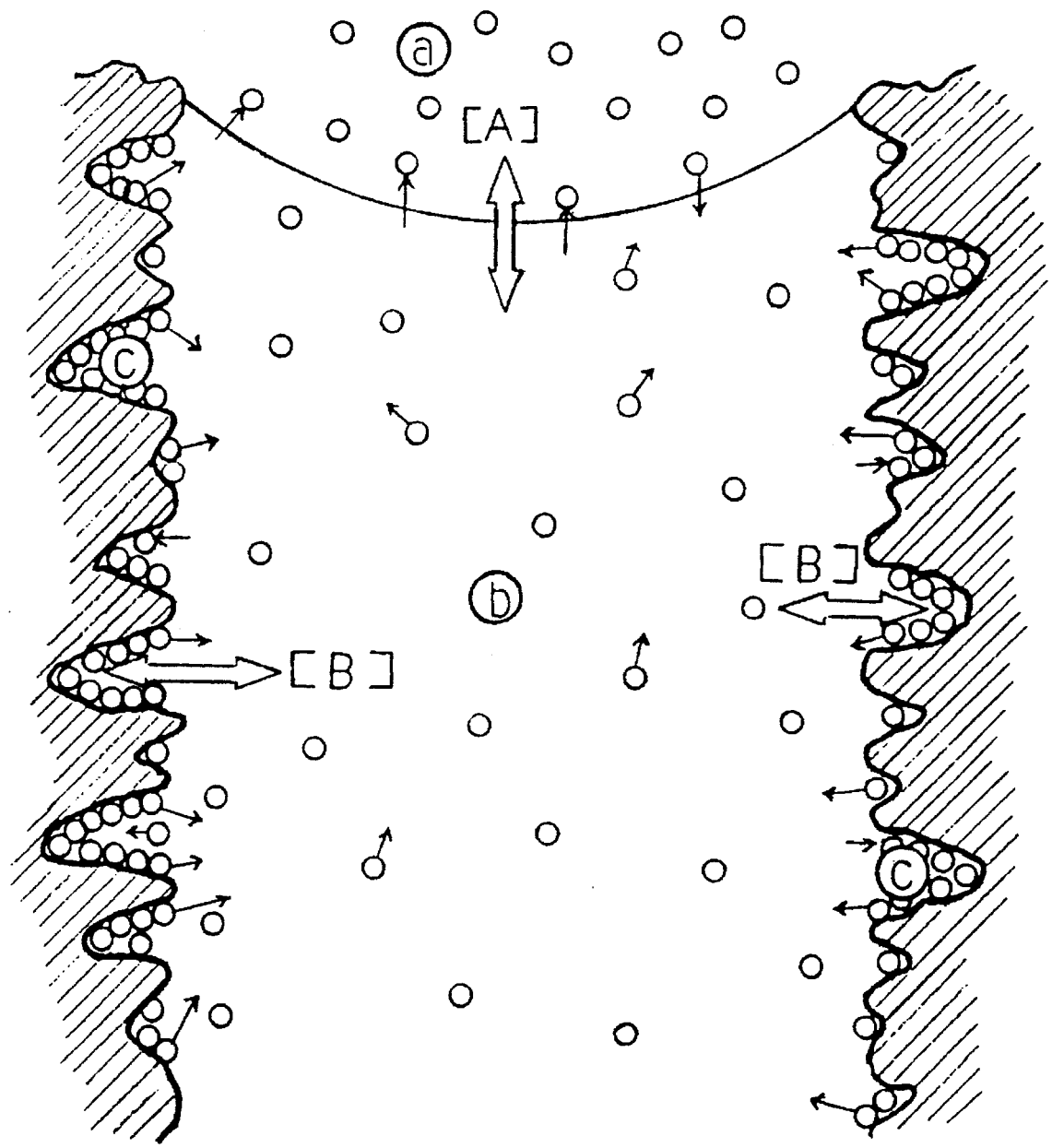
FIG. 2 is a diagram showing how odor molecules are distributed among three phases brought about by capillary condensation.
Figure 7:
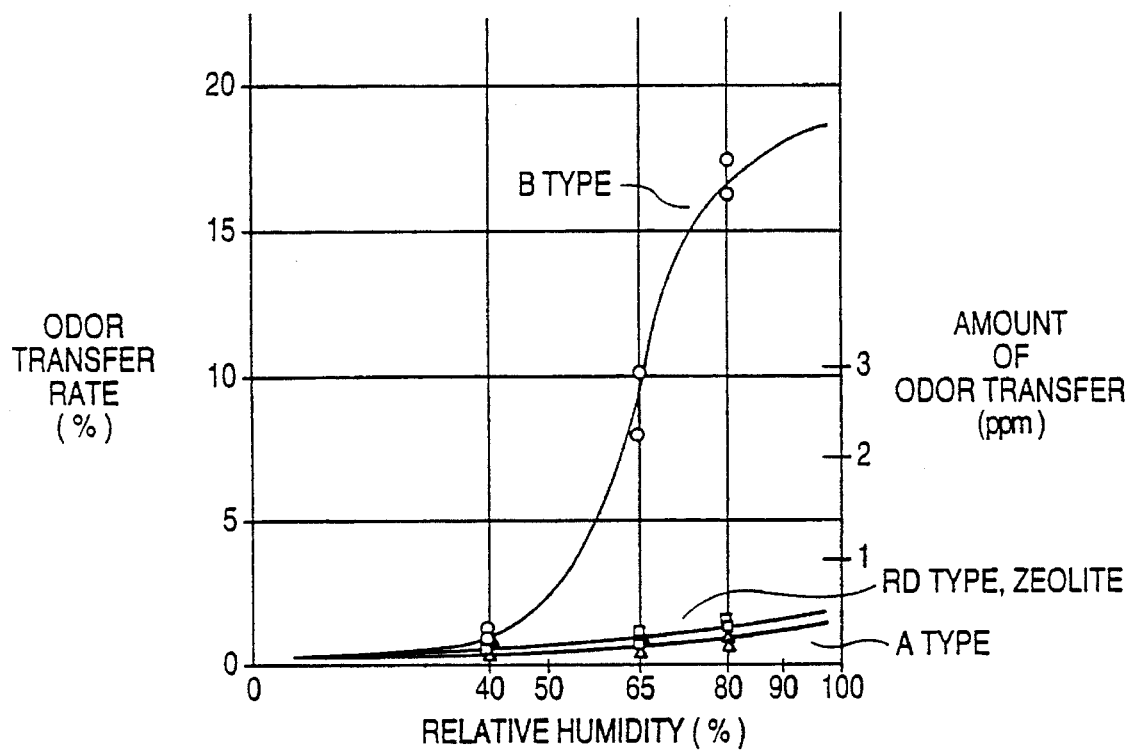
FIG. 7 is a graph showing the odor transfer rate and odor transfer amount of total heat energy exchanger elements.

Particularly in Japan, when humidity varies greatly as in the rainy season, odor generation often occurs from a total heat energy exchanger element. That is to say, it is possible that, in the case of using B-type silica gel as shown in FIG. 7, and other adsorbents showing capillary condensation, odorous material in return air is adsorbed by an element and transferred into supply air to exceed, in concentration, the level perceivable by the human sense of smell (in the case of toluene 0.48 ppm, cf., *Environmental Pollution and Poison, Dangerous Objects* (Organic Materials) by Hiroshi Horiguchi, Sankyo Publishing Co., Ltd., p. 458, Jun. 25, 1971). On the other hand, in the cases of A-type and RD-type silica gels and hydrophilic zeolite, there is no possibility of odorous substances transferring into the supply air to exceed, in concentration, the level perceivable by the human sense of smell (less than 0.48 ppm). For example, when air containing various odorous gases generating from the kitchen and lavatory of a building, and from human bodies, is passed as return air through a total heat energy exchanger for total heat energy recovery, the transfer of odorous gases into the supply air via the total heat energy exchanger can be prevented for the most part. This is due to the adsorption characteristics of A-type and RD-type silica gels and hydrophilic zeolite. That is to say, as shown in FIG. 1, even if the air humidity increases, the desiccative rate does not increase so much that odor substances adsorbed in the total heat energy exchanger element do not come to be suddenly purged. In other words, when the total heat energy exchanger is working and adsorbing moisture and odorous substances at the same time, the adsorption characteristic does not suddenly increase, as shown by the equilibrium isotherms for adsorption in FIG. 1, even if the relative humidity of the outer air suddenly increases. Therefore, desorption of odorous substances adsorbed is extremely slow and the human sense of smell does not perceive odor. In this case, it is also possible to increase the latent heat exchange efficiency in conditions of high humidity atmosphere by mixing an appropriate amount of B-type silica gel, i.e, in the level of amount that odor in supply air SA is not perceived by a person even if the humidity suddenly increases, for example, in the ratio of 10–20% to the total amount of adsorbent.

Figure 9:
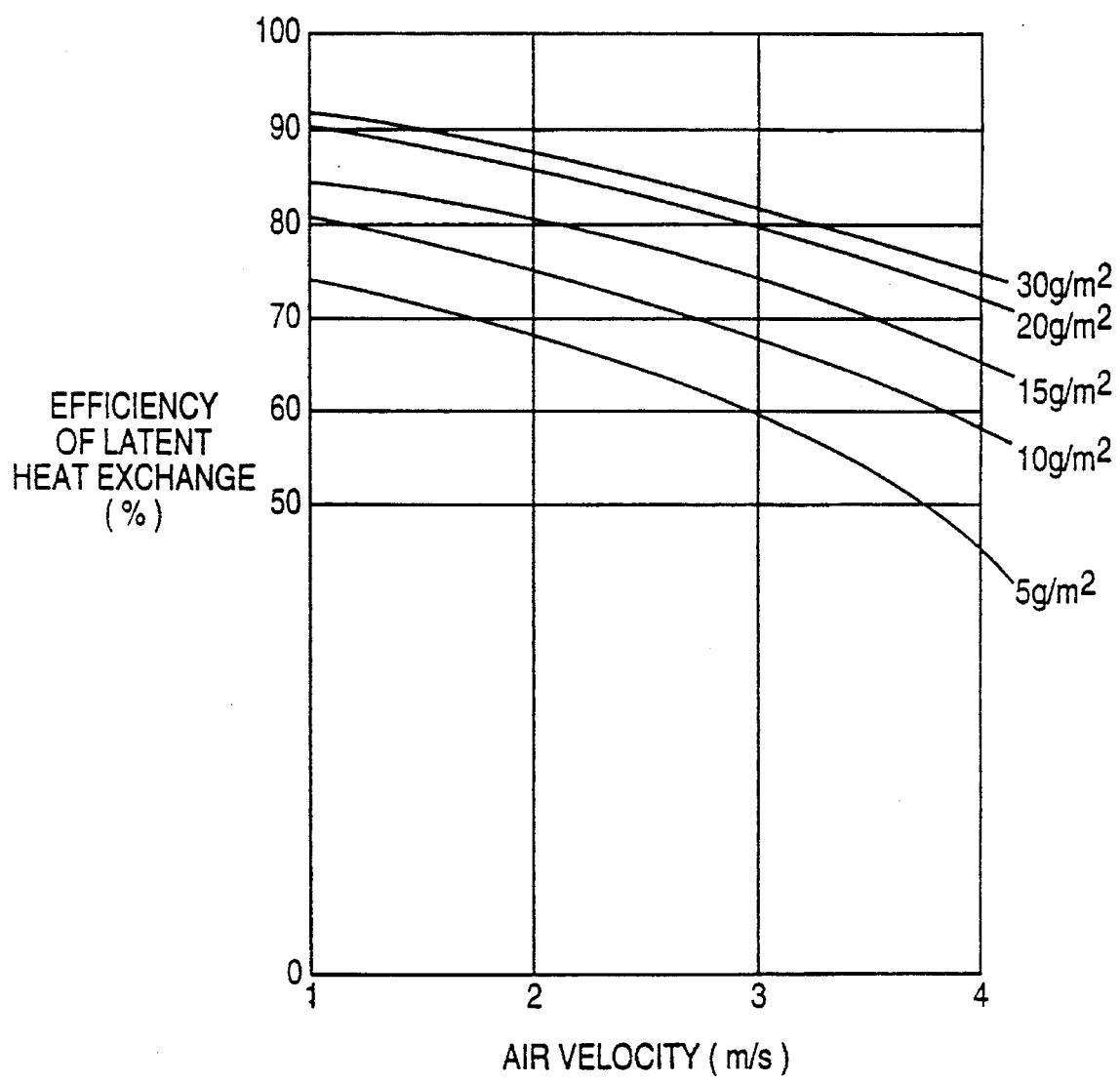
FIG. 9 is a graph showing the latent heat exchange efficiency of total heat energy exchanger elements using various amounts of silica gel.

FIG. 9 shows the relationship between the fixed amount of A-type silica gel and the latent heat exchange efficiency ($n_x$) when the single-faced corrugated sheet has 4.2 mm of wave length P and 2.0 mm of wave height h and a cylindrical element, i.e., a rotor, has 200 mm of width t and 15 r.p.m. of rotation speed. In the drawing, the abscissa shows air velocity (m/s) of feed air and return air at the element inlet.

As seen in the drawing, when the fixed amount of A-type silica gel is 5 $g/m^2$ and the air velocity 2 m/s, the efficiency is 67%. When the air velocity is 3 m/s, $n_x$ is as low as 60%. As the fixed amount increases from 10 $g/m^2$ to 15 $g/m^2$ and to 20 $g/m^2$, the efficiency increases. When the fixed amount is 30 $g/m^2$, the efficiency is 80% at the same air velocity of 3 m/s, and the efficiency increases little even if the fixed amount is further increased. Here the conditions are: outer air temperature is 33° C., the relative humidity is 55%, the return air temperature is 25° C. and the relative humidity is 70%.

As the total heat energy exchanger element of the present invention is obtained, as described above, by adhering or impregnating particulates of A-type, RD-type silica gel, activated alumina or zeolite whose equilibrium isotherms for adsorption do not rise rapidly in relative humidity more than about 40%, and which have no hysteresis phenomena, i.e., adsorbents in which adsorbed humidity does not cause capillary condensation as a main component of adsorbent to the sheet surface with adhesive or binder, and by laminating this sheet to form a honeycomb structure, it has the effect of preventing odor generation in the room. In other words, various odor substances contained in return air are adsorbed by the adsorbent in the element while driving, but these odorous substances adsorbed are not purged by adsorption of water vapor at high relative humidity, and are not transferred into the supply air.

Also, in the manufacture of the total heat energy exchanger element of the present invention, adhesive or binder is applied on the surface of the sheet of metals or plastics. Then particulates of adsorbents mentioned above are attached on the adhesive or binder layer and the sheet is heated for a short time at a high temperature of 100°–250° C. By this process, the adhesive or binder hardens completely and at the same time the adsorbent particulates are fixed with one part of each particulate buried in the adhesive or binder layer and the other part exposed. Thus, total heat energy exchange efficiency is performed for a long time without the danger of adsorbent particulates falling off from the sheet surface by operation or washing of the total heat energy exchanger element.

Figure 10:
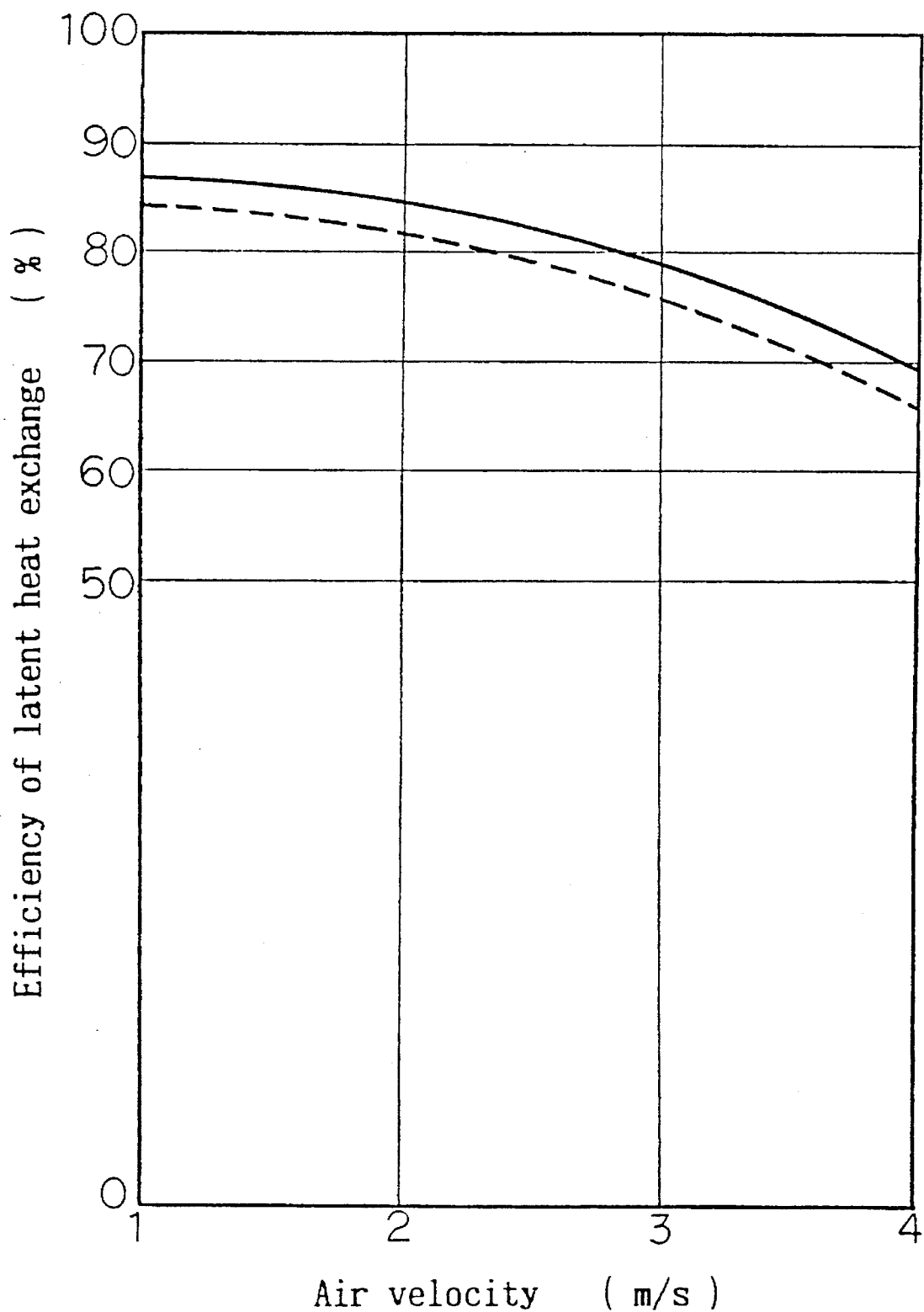
FIG. 10 is a graph showing the latent heat exchange efficiency of a total heat energy exchanger element using a blowing agent.

When A-type and/or RD-type silica gel particulates are mixed in the adhesive or binder as shown in Example 2, or when A-type and/or RD-type silica gel particulates and chemical blowing agents are mixed in the adhesive or binder as shown in Example 3, and when the adhesive or binder is applied on the sheet surface and hardened by heating, gases adsorbed to silica gel mixed in the adhesive or binder are desorbed to form many minute communicating pores in the adhesive or binder layer, or the chemical blowing agent further decomposes and blows to form many minute communicating pores from the sheet surface to the adhesive or binder layer surface. Thus, the adsorbent particles buried in the adhesive or binder layer effectively function through the communicating pores. In the latter case, when A-type silica gel was fixed in the ratio of 15 $g/m^2$, 84% of the latent heat exchange efficiency was performed at a flow velocity of 2 m/s, as shown by the solid line in FIG. 10, which is about 3% higher than where no chemical blowing agent is mixed in the adhesive, as shown by the dashed line in FIG. 10.

Adding hydrophilic zeolite as a component of adsorbent (Example 4) has the effect of increasing the latent heat exchange efficiency of the total heat energy exchanger element in treating low humidity air and without the possibility of increasing the odor transfer ratio. However, in this case the zeolite used should be one with few mesopores which causes little capillary condensation.

Although a preferred embodiment of the present invention has been described, it is to be understood that other embodiments may exist and changes made without departing from the spirit and scope of the invention.

What is claimed is:

1. A total heat energy exchanger element preventing the transfer of odors, comprising;

a sheet;

an adsorbent on said sheet, said adsorbent having:

equilibrium isotherms for adsorption demonstrating no rapid rise in relative humidity of more than approximately 40%, and equilibrium isotherms for adsorption and desorption demonstrating no hysteresis phenomena which occur where the adsorbed humidity shows capillary condensation as a main component of the adsorbent: and a corrugated material adhered to the sheet.

2. A total heat energy exchanger element as in claim 1, wherein said sheet is laminated and formed as a honeycomb structure.

3. A total heat energy exchanger element as in claim 2, wherein said adsorbent is rigidly adhered with an adhesive to the surface of said sheet.

4. A total heat energy exchanger element as in claim 2, wherein said adsorbent as particles is rigidly affixed with a binder impregnated into said sheet.

5. A total heat energy exchanger element as in claim 1, wherein said adsorbent is selected from the group consisting of A-type silica gels, RD-type silica gels and hydrophilic zeolite.

6. A total heat energy exchanger element as in claim 4, wherein said adsorbent comprises particles in the ratio of 5–30 g per 1 m$^2$ sheet area.

7. A total heat energy exchanger element as in claim 1, wherein said sheet is selected from the group consisting of metal, plastic and ceramic fiber paper.

8. A total heat energy exchanger element as in claim 3, wherein minute communicating pores are formed in the adhesive layer.

9. A total heat energy exchanger element as in claim 3, wherein said adsorbent comprises particles in the ratio of 5–30 g per 1 m$^2$ sheet area.

10. A total heat energy exchanger element comprising:

a sheet;

an adsorbent, located on said sheet, said adsorbent having;

equilibrium isotherms for adsorption demonstrating no rapid rise in relative humidity of more than approximately 40%, and equilibrium isotherms for adsorption and desorption demonstrating no hysteresis phenomena which occur where the adsorbed humidity shows capillary condensation as a main component of the adsorbent; and a corrugated material adhered to the sheet, the sheet, adsorbent, and corrugated material forming a corrugated sheet, the corrugated sheet being wound into a roll to form a cylindrical honeycomb structure which is divided into a supply air zone and an exhaust air zone, said cylindrical honeycomb structure being rotatable slowly such that heat and humidity are continuously exchanged between outer air and return air.

11. A total heat energy exchanger element as in claim 10, wherein said adsorbent is rigidly adhered with an adhesive to the surface of said laminate.

12. A total heat energy exchanger element as in claim 10, wherein said adsorbent as particles is rigidly affixed with a binder impregnated into said laminate.

13. A total heat energy exchanger element as in claim 10, wherein said adsorbent is variously selected from the group consisting of A-type silica gels, and RD-type silica gels and hydrophilic zeolite.

14. A total heat energy exchanger element as in claim 12, wherein said adsorbent comprises particles in the ratio of 5–30 g per 1 m$^2$ laminate area.

15. A total heat energy exchanger element as in claim 10, wherein said laminate is selected from the group consisting of metal, plastic and ceramic fiber paper.

16. A total heat energy exchanger element as in claim 11, wherein minute communicating pores are formed in the adhesive layer.

17. A total heat energy exchanger element as in claim 11, wherein said adsorbent comprises particles in the ratio of 5–30 g per 1 m$^2$ laminate area.

18. A filter material comprising:

a sheet;

an adsorbent selected from the group consisting of RD-type silica gel, A-type silica gel, hydrophilic zeolite and active alumina, the adsorbent having:

equilibrium isotherms for adsorption demonstrating no rapid rise in relative humidity of more than approximately 40%, and equilibrium isotherms for adsorption and desorption demonstrating no hysteresis phenomena which occur where the adsorbed humidity shows capillary condensation as a main component of the adsorbent;

an adhesive adhering the adsorbent to the sheet;

a corrugated material adhered to the sheet, the sheet, adsorbent, and corrugated material forming a corrugated sheet;

a boss around which the corrugated sheet is wound;

a generally circular surround member surrounding the corrugated sheet wound; boss;

spokes extending from the boss to the surround member; and rotation means for allowing the corrugated sheet, boss, surround member and spokes to rotate together around an axis defined by a center of the surround member.

19. A filter element as in claim 18, wherein the sheet is aluminum.

20. A filter element as in claim 18, wherein the spokes extend through the corrugated material.

21. A filter element as in claim 18, wherein there is an equal area between adjacent spokes which corresponds to the area of a duct through which inlet air travels and corresponds to the area of a duct through which exhaust air travels.

22. A filter element as in claim 18, wherein the adsorbent is in the form of a powder having a particle size less than 0.2 mm.

* * * * *